(12) United States Patent  (10) Patent No.: US 9,107,347 B2
Esau et al.  (45) Date of Patent: Aug. 18, 2015

(54) KNOTTER MECHANISM FOR CROP BALERS AND THE LIKE

(75) Inventors: Edward W. Esau, Hesston, KS (US); Lawrence D. Retzlaff, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 436 days.

(21) Appl. No.: 13/294,693

(22) Filed: Nov. 11, 2011

(65) Prior Publication Data

US 2013/0118366 A1   May 16, 2013

(51) Int. Cl.
  *A01D 59/04* (2006.01)
  *A01F 15/08* (2006.01)

(52) U.S. Cl.
  CPC .................................. *A01F 15/0858* (2013.01)

(58) Field of Classification Search
  CPC ..................... A01F 15/0858; A01F 2015/0866
  USPC .................. 100/4, 13, 17, 18, 19 R, 32, 33 R; 56/341, 343, 433; 289/2, 11, 13, 16
  See application file for complete search history.

(56) References Cited

U.S. PATENT DOCUMENTS

| 3,037,535 | A  | * | 6/1962 | Linehan et al. | 140/115 |
|---|---|---|---|---|---|
| 3,101,963 | A  |   | 8/1963 | Sullivan et al. | |
| 3,202,087 | A  |   | 8/1965 | Burford | |
| 4,142,746 | A  |   | 3/1979 | White | |
| 4,735,446 | A  |   | 4/1988 | Homberg | |
| 4,765,235 | A  | * | 8/1988 | Schrag et al. | 100/3 |
| 6,705,214 | B1 | * | 3/2004 | Stamps | 100/14 |
| 7,121,195 | B2 | * | 10/2006 | Daniel et al. | 100/33 R |
| 7,296,828 | B2 | * | 11/2007 | Schoonheere et al. | 289/2 |
| 2009/0250930 | A1 | * | 10/2009 | Eylenbosch et al. | 289/2 |
| 2010/0108413 | A1 | * | 5/2010 | Lang et al. | 180/53.1 |

OTHER PUBLICATIONS

Parts List for Model 1592 Baler, J.A. Freeman & Son, Inc. (2000), pp. 3, 4, 80, 82, 84, and 86.

* cited by examiner

*Primary Examiner* — Jimmy T Nguyen (57) ABSTRACT

Knotter operation on a crop baler or the like is controlled electronically by a programmable electronic control unit. Rotary and/or linear electric, hydraulic, or pneumatic drive motors are utilized to drive the knotting components and are controlled by the electronic control unit.

18 Claims, 10 Drawing Sheets

KNOTTER MECHANISM FOR CROP BALERS AND THE LIKE

TECHNICAL FIELD

The present invention relates to equipment for binding bales of crop material and the like while such bales are being produced in a baler.

BACKGROUND AND SUMMARY

Mechanisms for binding bales of crop materials or other substances with strands of twine or wire are well known in the art. One type of such mechanism is often referred to as a "Deering" knotter and is disclosed, for example, in U.S. Pat. No. 4,735,446. Another type of mechanism is sometimes referred to as a "McCormick" bowtie knotter such as disclosed, for example, in U.S. Pat. No. 3,101,963. An example of a wire twister mechanism is disclosed in U.S. Pat. No. 3,202,087. Double knotter machines, wherein each loop around the bale has a pair of knots that join together two end-to-end segments of the strand, have also been very popular, particularly in connection with large square balers that produce large, heavy, dense bales. One example of such a double knotter is disclosed in U.S. Pat. No. 4,142,746 assigned to the assignee of the present invention.

The present invention provides principles that may be advantageously applied to all known types of knotting mechanisms, including but not limited to Deering knotters, McCormick bowtie knotters, wire twisters, and double knotters. Whereas prior devices have relied upon complex mechanical drive and clutch systems deriving their power from the main drive train of the baler and mechanical means for triggering the knotting cycle, the present invention largely eliminates such machinery and provides various electric, hydraulic or pneumatic motors for the knotter components that are controlled by an electronic control system. While individual components of the knotter mechanism, such as strand holders, knot formers, knot strippers, strand fingers, tucker fingers, wire twisters and the like may remain substantially unchanged from prior designs, the means for driving and controlling such components are new in accordance with the principles of the present invention.

DETAILED DESCRIPTION

As will be apparent, the principles of the present invention may be embodied in a variety of different formats. Thus, it is to be understood that the drawings and written description contained herein are intended to be exemplary only and should not be utilized in a limiting sense when interpreting the scope of the claims which follow. For example, the particular embodiment illustrated in the drawings comprises a device suitable for double knotting, but its principles are manifestly not limited to a double knotter.

Not all details of construction of a double knotter are illustrated in the accompanying drawings. Therefore, the earlier referenced double knotter U.S. Pat. No. 4,142,746 is hereby incorporated by reference into the present specification for such details as may be necessary to provide a full and complete description of a double knotter. Similarly, wire twister U.S. Pat. No. 3,202,087 is hereby incorporated by reference into the present specification for a disclosure of a suitable wire twister with which the principles of the present invention may be utilized; McCormick bowtie knotter U.S. Pat. No. 3,101,963 is hereby incorporated by reference into the present specification for a disclosure of a suitable McCormick knotter with which the principles of the present invention may be utilized; and Deering knotter U.S. Pat. No. 4,735,446 is hereby incorporated by reference into the present specification for a disclosure of a suitable Deering type knotter with which the principles of the present invention may be utilized.

Figure 1:
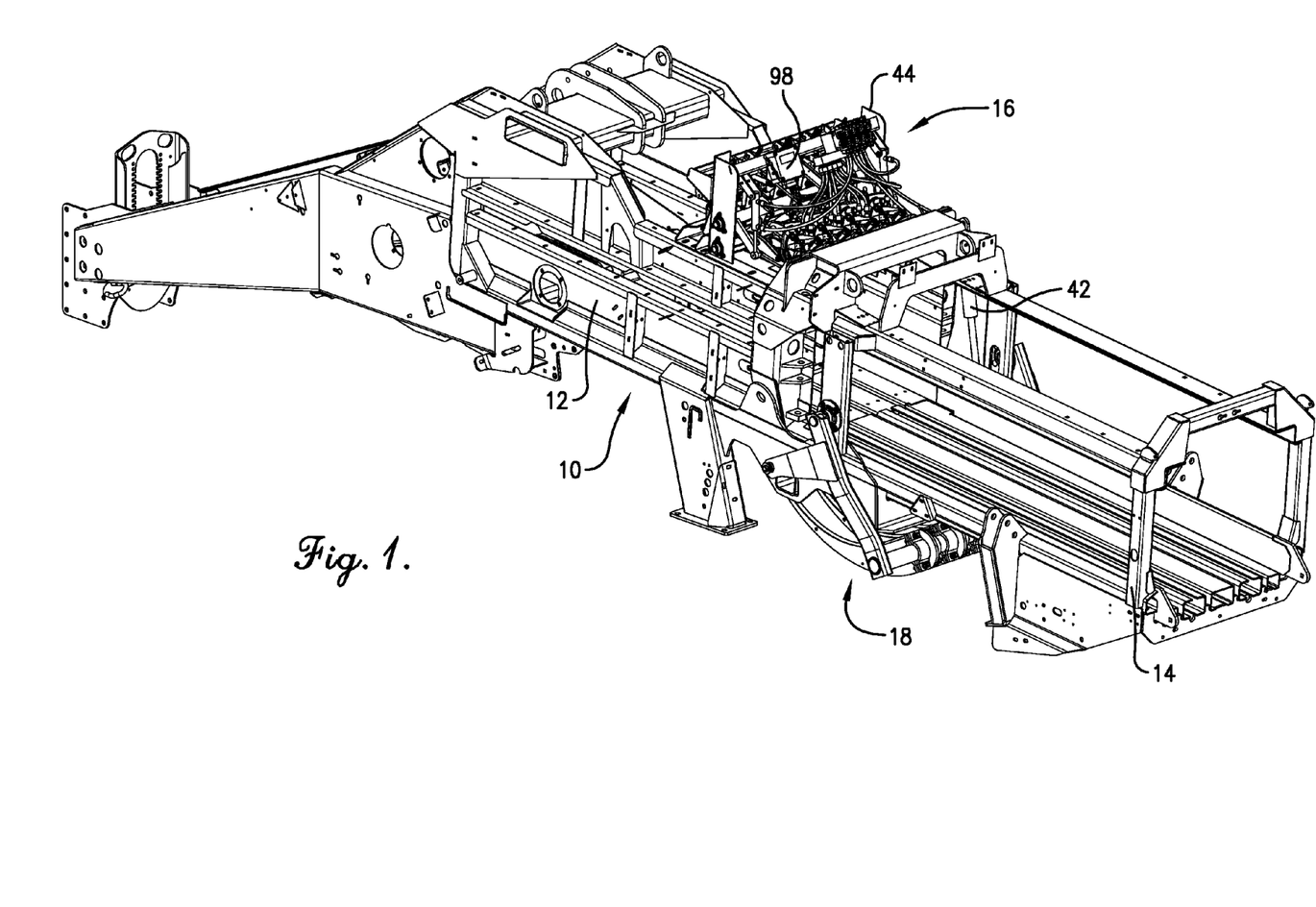
FIG. 1 is a left, rear perspective view of a partially assembled crop baler with which the principles of the invention may be utilized.

The baler 10 in FIG. 1 has a baling chamber 12 within which crop material or the like may be compressed into rectangular bales. In the illustrated embodiment, a reciprocating plunger (not shown) moves fore-and-aft within chamber 12 in the usual manner to press successive newly introduced charges of crop material against a previously formed and tied bale to thereby form a new bale. This action also causes both bales to intermittently advance toward the rear discharge opening 14 of the baler. A knotter assembly 16 is mounted on top of the frame of the baler 10 and cooperates with a needle assembly 18 suspended below the baler frame to loop strands of binding material around a finished bale and bind the strands with one or more knots. The term "strand" as used herein is intended to mean not only twine made from natural or synthetic fibers, but also metallic wire or strapping material. Additionally, the term "knot" as used herein is intended to mean not only a classic twine knot such as formed by a Deering or McCormick knotter, but also a twisted wire securement formed by a wire twister, and any other type of fastening. Likewise, the terms "tie" and "tying" as used herein are intended to mean not only knot forming in the usual manner, but also wire twisting and other fastening procedures.

Figure 2:
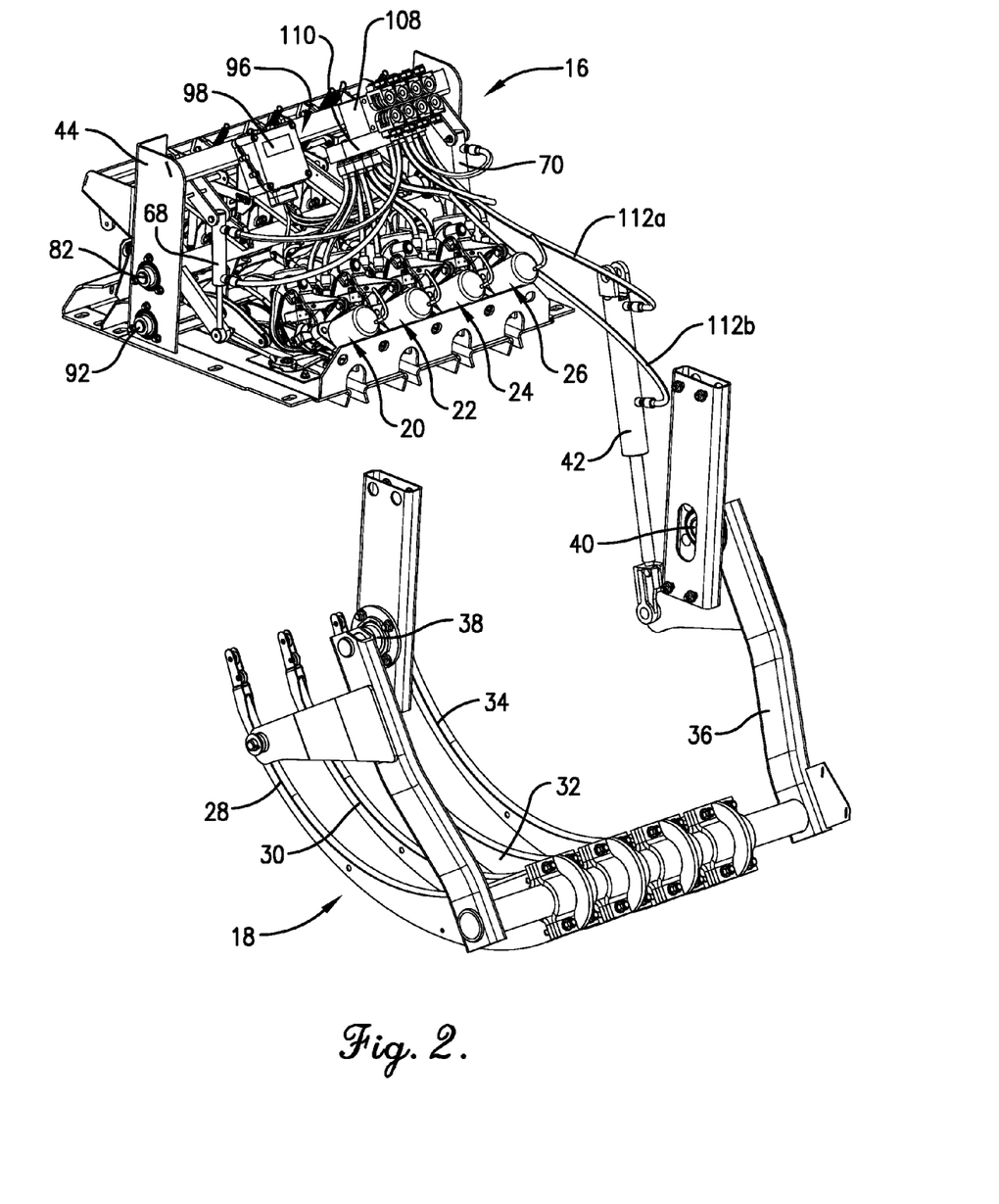
FIG. 2 is a slightly enlarged, left rear perspective view of the knotter assembly and associated needle assembly from the baler of FIG. 1.

As illustrated in FIG. 2, knotter assembly 16 is in the form of a module that can be bolted in place on the frame of baler 10. In the illustrated embodiment, knotter assembly 16 comprises four knotter subassemblies 20, 22, 24, and 26 for the purpose of forming knots in four corresponding, parallel strands of binding material looped around the bale. Correspondingly, needle assembly 18 includes four separate needles 28, 30, 32, and 34 for supplying strands from a lower strand source (not shown) to the subassemblies 20-26. As subsequently explained in further detail, the particular knotter assembly 16 disclosed herein is adapted for double knotting, and thus needles 28-34 are also operable to present strands from a second, upper source of strand supply (not shown) to the knotter subassemblies 20-26. Needles 28-34 are mounted on a shuttle 36 that swings about a pair of horizontal pivots 38 and 40 during each tying cycle. A double acting linear motor 42, preferably in the form of a hydraulic piston and cylinder assembly, is operably coupled with shuttle 36 for swinging the same through its range of travel.

Knotter assembly 16 comprises an open box-like chassis 44 that supports and contains the knotter subassemblies 20-26. Inasmuch as knotter subassemblies 20-26 are identical to one another, only subassembly 20 will be described in detail, with the understanding that such description applies equally to all the other subassemblies as well.

Figure 3:
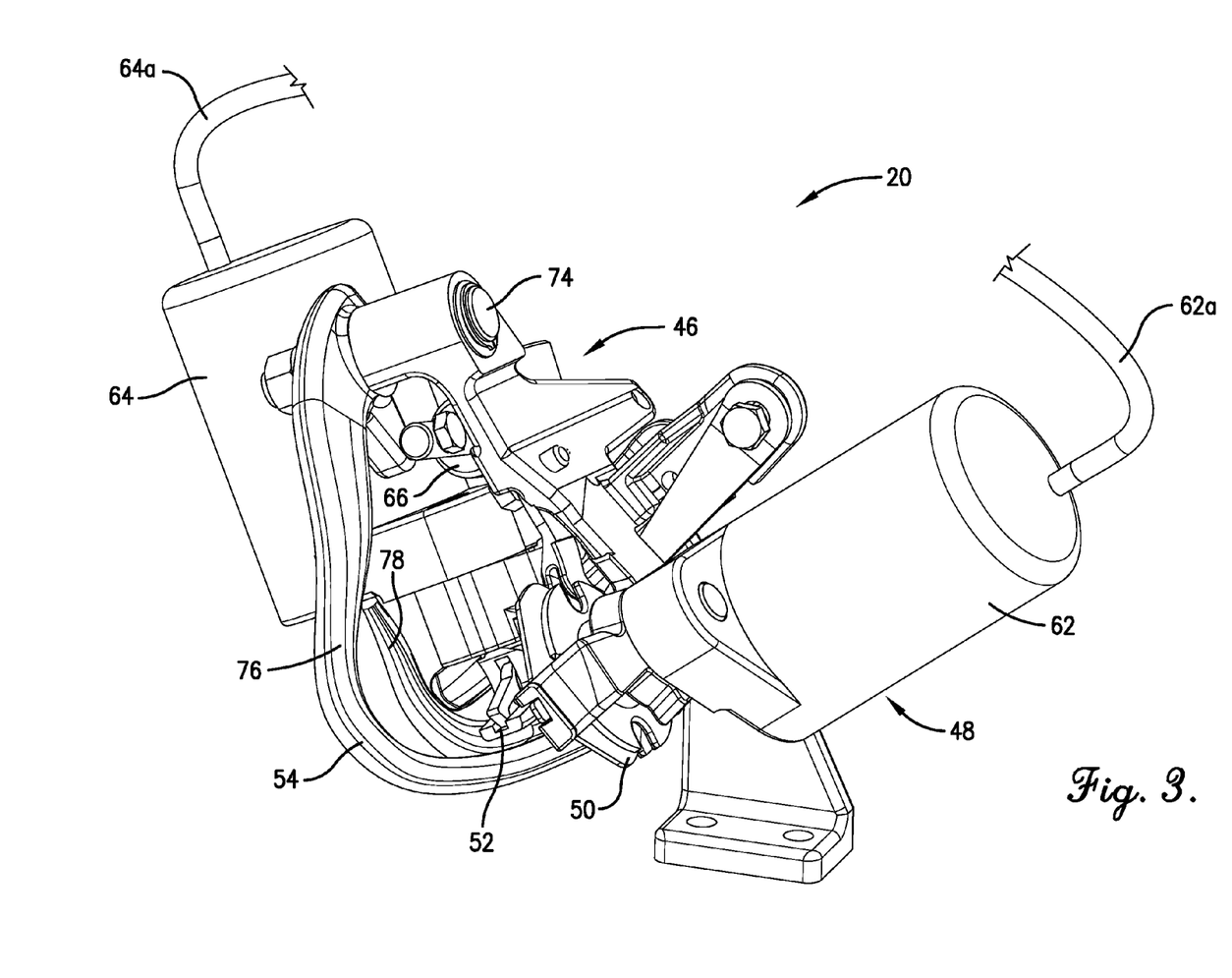
FIG. 3 is an enlarged, left rear perspective view of a knotter subassembly of the larger assembly illustrated in FIGS. 1 and 2.
Figure 8:
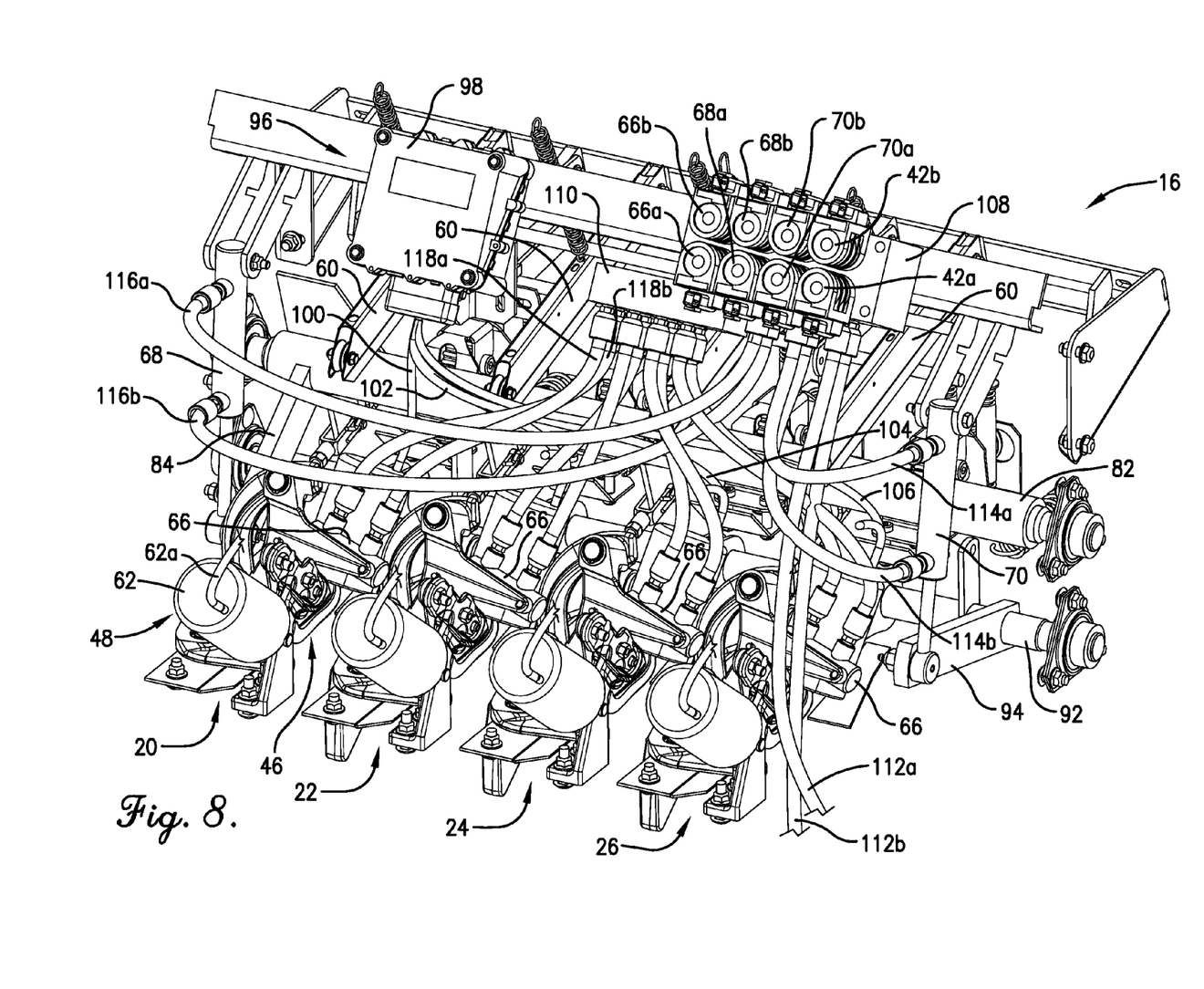
FIG. 8 is a fragmentary, right rear perspective view of the entire knotter assembly on the baler.

Knotter subassembly 20 broadly includes a knotter 46 and a drive system 48 for operating knotter 46. In the illustrated embodiment, knotter 46 includes a strand holder 50 (which may comprise the usual rotatable discs) for holding opposite ends of a strand during knot formation, a rotary knot former 52 (which may comprise the usual bill hook with a clamping jaw) for forming one or more knots in the strand(s) held by strand holder 50, a knot stripper 54 of well-known construction for stripping a completed knot off of knot former 52 and cutting the strand loop of the previously tied bale from the strand loop around the next forming bale, a horizontally operating strand finger 56 of well-known construction (FIG. 9) for assisting in placing the strand appropriately on knot former 52, and a vertically operating strand tucker finger 58 of well-known construction for assisting in presenting the upper strand to the needle 28 and knot former 52 when knotter 46 is a double knotter. Knotter 46 may also include the usual vertically swingable, spring-loaded twine tensioning arm 60 as illustrated in FIG. 8.

Figure 4:
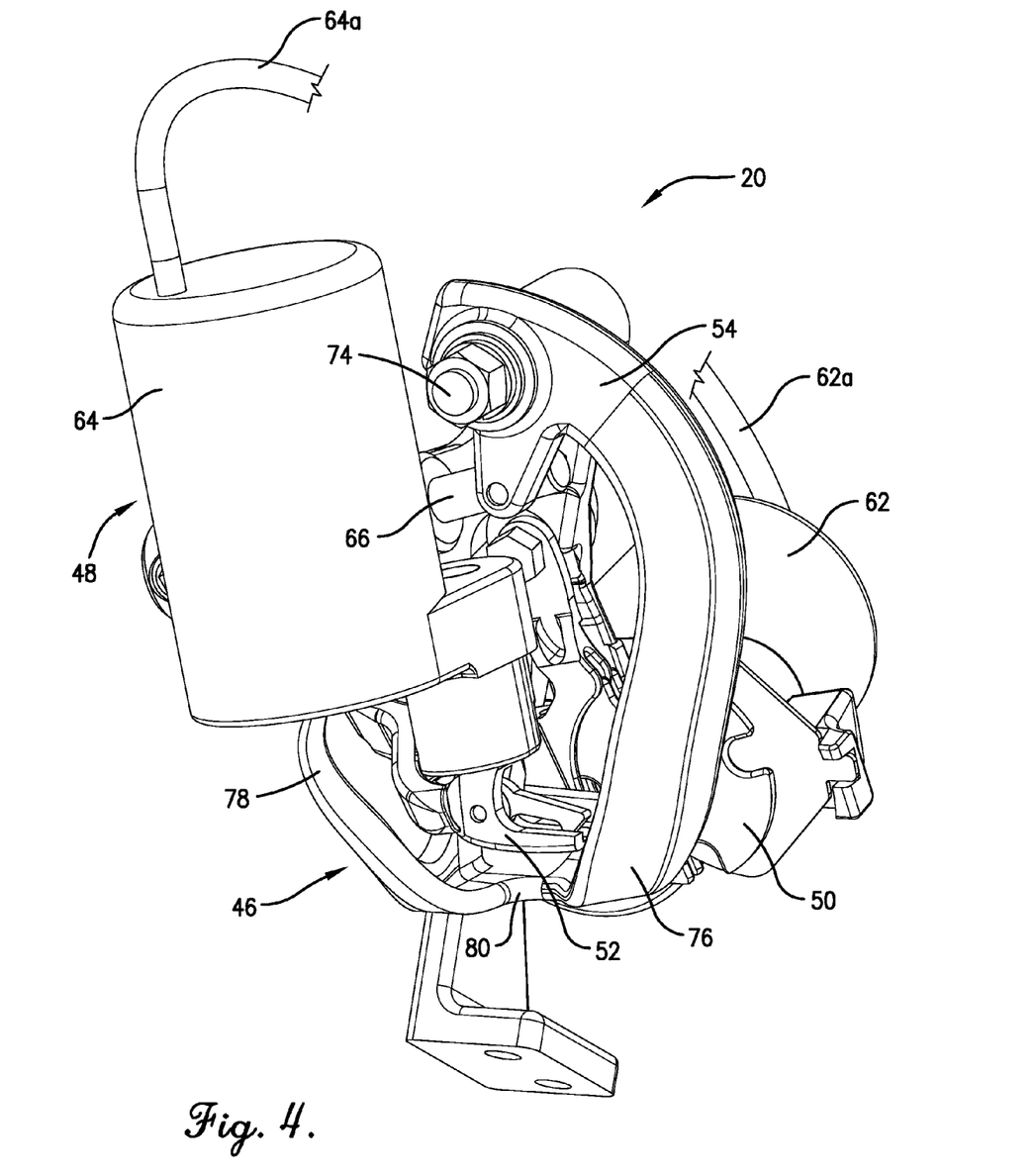
FIG. 4 is an enlarged, left front perspective view taken from a lower angle of the knotter subassembly of FIG. 3.
Figure 5:
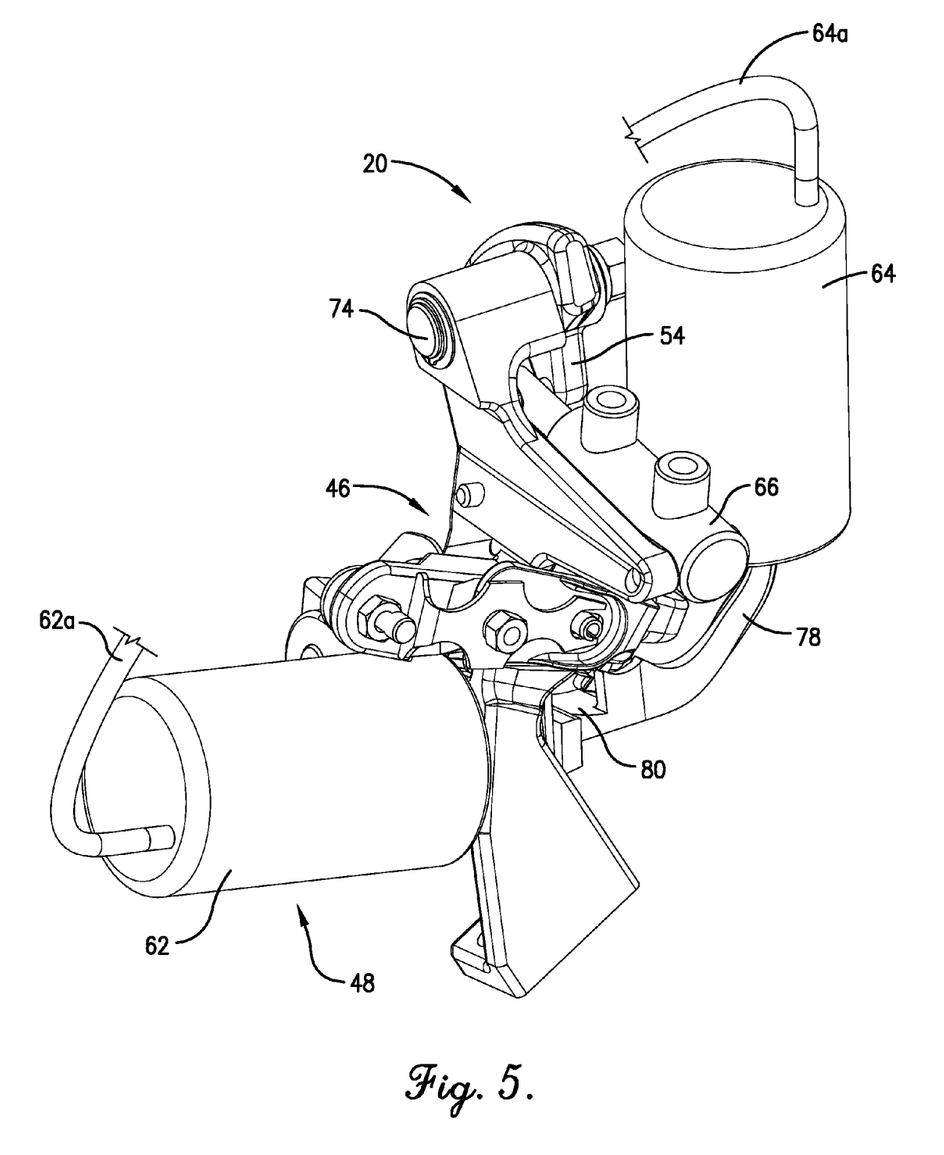
FIG. 5 is an enlarged, right rear perspective view taken from a higher angle of the knotter subassembly.
Figure 6:
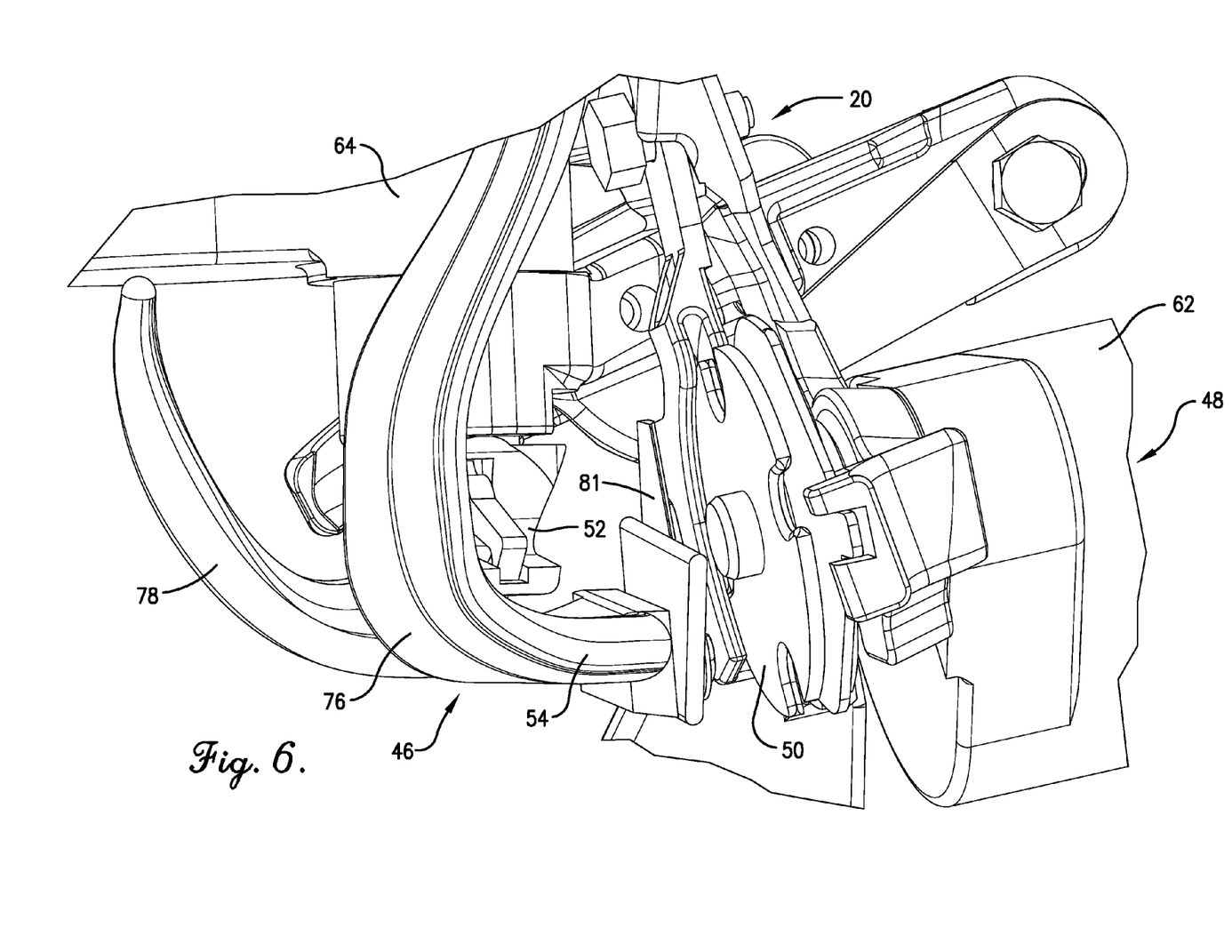
FIG. 6 is a fragmentary, further enlarged, left front perspective view of the knotter subassembly.

Drive system 48 for knotter 46 includes a rotary motor 62 operably coupled with strand holder 50, a rotary motor 64 operably coupled with knot former 52, a double-acting linear motor 66 operably coupled with stripper arm 54, a double-acting linear motor 68 operably coupled with strand finger 56, and a double-acting linear motor 70 operably coupled with tucker finger 58. Rotary motors 62 and 64 may comprise electrically powered motors or fluid-pressure motors such as hydraulic or pneumatic motors. In the illustrated embodiment, motors 62 and 64 are electric motors and are connected by respective wiring harnesses 62a and 64a to a source of control and electrical power for independent operation. Appropriate gearing (not shown) is associated with each of the motors 62, 64 for driving the strand holder 50 and knot former 52 through an appropriate amount of angular movement during each knotting cycle.

Figure 7:
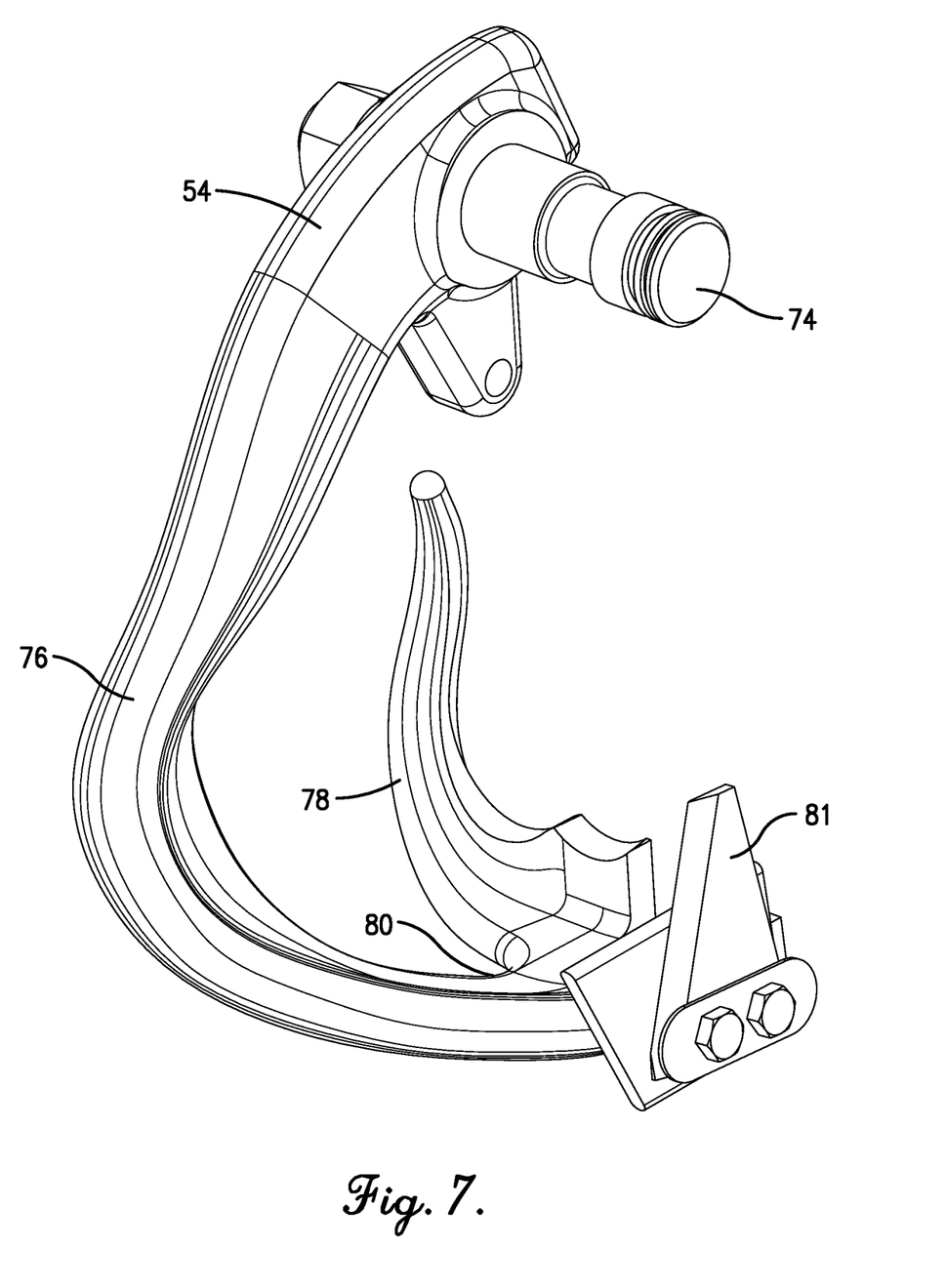
FIG. 7 is an enlarged, left rear perspective view of the stripper/knife arm of the knotter subassembly.

Stripper arm motor 66 is preferably a double-acting hydraulic piston and cylinder assembly for swinging stripper arm 54 back and forth about a fore-and-aft pivot 74 during each knotting cycle. Stripper arm 54 is generally in the nature of a fork having a pair of limbs 76 and 78 as detailed in FIG. 7. Limbs 76, 78 converge to a crotch 80, on the backside of which is mounted a knife blade 81 for severing successive strand loops from one another.

Figure 9:
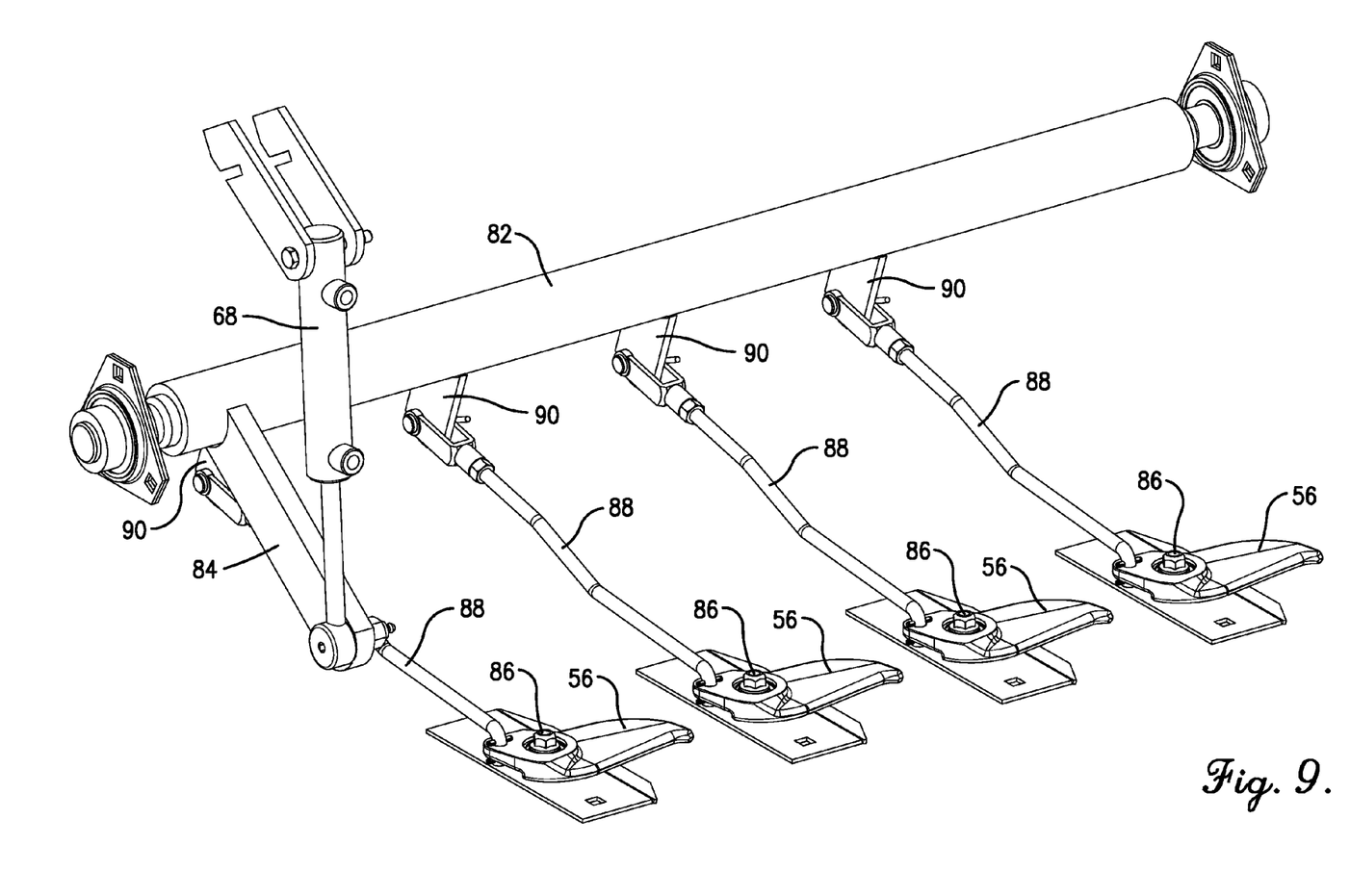
FIG. 9 is a fragmentary, enlarged, left rear perspective view of horizontally operating strand fingers of the knotter assembly illustrating the manner in which the strand fingers are all operated by a common operating shaft and linear motor.
Figure 10:
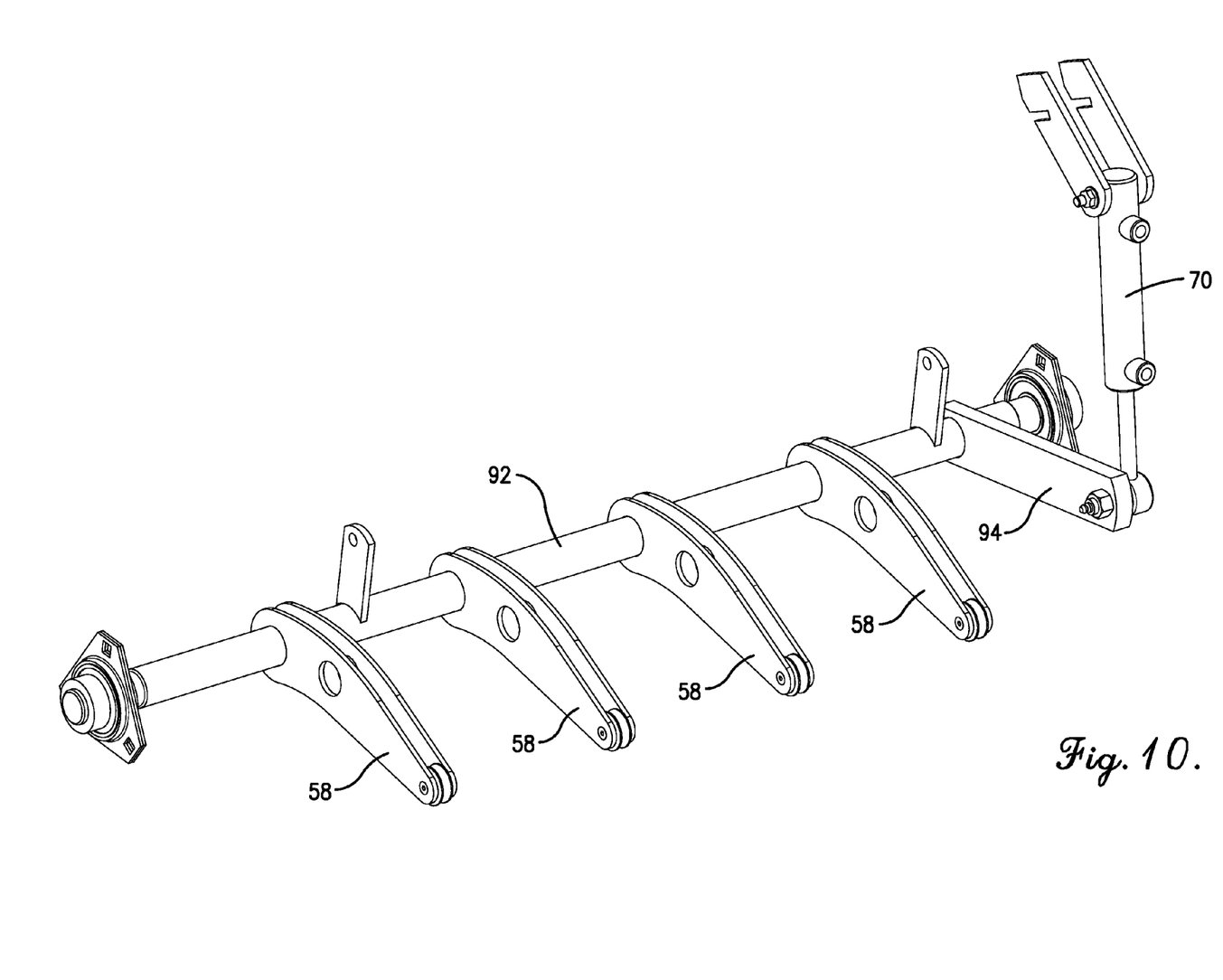
FIG. 10 is a fragmentary, left rear perspective view of a set of vertically operating tucker fingers of the knotter assembly illustrating the manner in which the individual tucker fingers are all driven by a common operating shaft and linear motor.

Motors 68 and 70 for strand finger 56 and tucker finger 58, respectively, preferably comprise double-acting hydraulic piston and cylinder assemblies. Preferably, instead of having the four strand fingers 56 of the knotter assembly 16 operated by separate motors, all strand fingers 56 in the illustrated embodiment are operated by a single motor 68 that is operably coupled with a common operating shaft 82 by a crank 84.

Each strand finger 56 oscillates horizontally about an upright pivot 86 and is connected to common operating shaft 82 by a link 88 and short crank 90. Operating shaft 82 is bearing-supported at its opposite ends by upright sidewalls of chassis 44.

Similarly, rather than having an individual motor 70 for each tucker finger 58 of knotter assembly 16, all tucker fingers 58 are fixed to a common transverse operating shaft 92 that is, in turn, operably coupled with motor 70 via a crank 94 for oscillating tucker fingers 58 up and down. Operating shaft 92 is bearing-supported at its opposite ends by the sidewalls of chassis 44.

As illustrated particularly in FIG. 8, a control system 96 is connected with the various motors of drive system 48 for controlling operation of such motors. Among other things, control system 96 includes a programmable electronic control unit 98 that is operable to output appropriate electrical control signals for causing the appropriately timed actuations and deactuations of the motors. Wiring harnesses 100, 102, 104, and 106 contain appropriate electrical conductors that electrically connect electronic control unit 98 with holder motors 62 and knot former motors 64, such harnesses leading to knot former motors 64 in the disclosed embodiment to facilitate illustration.

Additionally, control system 96 includes a hydraulic control block 108 that is plumbed to a source of pressurized hydraulic fluid (not shown). Control block 108 has a number of electrically actuated solenoid valves controlled by electronic control unit 98. Such valves include a pair of solenoid valves 68a and 68b for strand finger actuating cylinder 68, a pair of solenoid valves 70a and 70b for tucker finger actuating cylinder 70, a pair of solenoid valves 42a and 42b for needle shuttle cylinder 42, and a pair of solenoid valves 66a and 66b for the stripper arm cylinder 66. Solenoid valves 66a and 66b control the flow of hydraulic fluid to and from a manifold block 110 that is common to all of the stripper arm cylinders 66 and distributes fluid to and from such cylinders. A pair of hoses 112a and 112b connect control block 108 with needle shuttle cylinder 42, a pair of hoses 114a and 114b connect control block 108 with tucker finger cylinder 70, a pair of hoses 116a and 116b connect control block 108 with strand finger cylinder 68, and four pairs of hoses 118a and 118b connect manifold block 110 with the stripper arm cylinders 66. A wiring harness (not shown for reasons of clarity) electrically connects electronic control unit 98 with hydraulic control block 108 and with its associated solenoid valves 42a, 42b, 66a, 66b, 68a, 68b, and 70a, 70b for controlling such valves.

An arrangement in accordance with the principles of the present invention provides many significant benefits over conventional designs. For example, the placement or position of the knotters on the baler is not dependent upon or dictated by mechanical drive locations. Thus, the knotter assembly may be placed at any number of different positions best suited for the particular application at hand.

Another benefit is that the programmable nature of the electronic control unit allows the knotter function timing to be varied to provide the best tying results. This may include varying the speed of components, when they activate, and their timing relative to subsequent functions. It also provides the opportunity to tie the knot at any time, regardless of where the plunger or other parts of the baler may be disposed within their particular operating cycles. The tying cycle can even occur in subsequent plunger strokes and need not be timed to the initial trip cycle of the needles when they deliver strand(s) to the knotters.

A further benefit is that the strand delivery function performed by the needles can be carried out independently of the knotter cycle, and the needles may be operated mechanically, hydraulically, or electronically.

In addition, trash accumulation is reduced because the mechanism is compact with fewer moving parts than in the past, and reliability is increased due to the use of sealed components for the drive system and the elimination of open gears.

Furthermore, twine tension for high density bale tying can be more easily regulated by monitored tensioning systems.

Another advantage is that the operating components of the knotter assembly can be disposed closer to the top of the bale chamber than in prior designs, enabling the knots to be located closer to the bale surface as they are tied. This means that less slack is present in the loop around the bale so there is less opportunity for the bale to expand and take up such slack. Consequently, a bale that is high density during a compression stroke of the plunger when the knot is being tied stays high density even after the knot is stripped off the knotter.

It should be apparent from the foregoing that the principles of the present invention involving use of an electronic control system and a motor drive system for a knotter may be applied in a number of different ways. In the illustrated embodiment (which happens to be for a double knotter as noted earlier), the strand holders are each driven by their own independent motors, as are the knot formers and the knot stripper arms. However, it is within the purview of the present invention to provide a common drive motor for some or all of the strand holders and/or some or all of the knot formers and/or some or all of the knot stripper arms. Conversely, the horizontally moving strand fingers and vertically moving tucker fingers could each have their own separate motor instead of being driven in each instance by a single motor and common operating shaft.

Still further, it is within the purview of the present invention to have a knotting apparatus which retains much of the drive train of conventional systems, such as main gear 76, shaft 78, gear segments 98, 100, 106, 108, worm gear 102, bevel gears 96, 104, and cams 112, 134, and 140 of double knotter U.S. Pat. No. 4,142,746 but is not chain and sprocket-driven as in the '746 patent. Instead, each strand holder, knot former, and knot stripper would be mechanically driven in the usual conventional manner but the main drive shaft of the knotting apparatus would be actuated by a suitable motor, preferably but not necessarily a rotary hydraulic motor, which would in turn be controlled by a control system that includes a suitably programmed electronic control unit and a solenoid valve assembly if the drive is hydraulic. Various combinations and permutations of this arrangement are also possible.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A crop baler comprising:
   a bale chamber within which a bale of crop material is formed;
   a plurality of knotters for use in binding the bale with a corresponding plurality of binding strands looped around the bale, each of said knotters being operable when actuated to form at least one knot in its corresponding binding strand, each of said knotters comprising a strand holder for holding a strand during knot formation and a knot former for forming a knot when a strand is held by its corresponding strand holder;
   at least one actuating motor for each of said knotters, said at least one motor comprising a pair of separate motors for the knot former and the strand holder of each knotter; and
   a control system operably coupled with said motors for controlling operation of the motors.

2. A crop baler as claimed in claim 1, said actuating motors comprising electrically powered motors.

3. A crop baler as claimed in claim 1, said actuating motors comprising fluid pressure-operated motors.

4. A crop baler as claimed in claim 3, said fluid pressure-operated motors comprising rotary hydraulic motors.

5. A crop baler as claimed in claim 3, said fluid pressure-operated motors comprising pneumatic motors.

6. A crop baler as claimed in claim 1, each of said knotters further including an arm operable when actuated to move relative to said knot former in a direction for causing a completed knot to be stripped from the knot former, said at least one motor further comprising a fluid pressure-operated linear motor for effecting said stripping movement of said arm.

7. A crop baler as claimed in claim 1, each of said strands comprising a pair of end-to-end strand segments connected to one another at two connection points in each loop around a bale, said control system being operable to cause the knotter to form a knot at each of said two connection points of the strand segments.

8. A crop baler as claimed in claim 7, each of said knotters including a generally vertically swingable tucker finger operable when actuated to assist in presenting one of said strand segments to the corresponding knotter, said tucker fingers of the knotters being operated by a common operating shaft, said at least one motor comprising a fluid pressure-operated linear motor for driving said operating shaft in a generally oscillating movement in response to a signal from said control system.

9. A crop baler as claimed in claim 1, said knotters each including a finger operable when actuated to swing generally horizontally and position the strand in the corresponding knotter, said fingers of the knotters being operably coupled with a common operating shaft for actuation of said fingers in unison, said at least one motor comprising a fluid-pressure operated linear motor for driving the shaft in a generally oscillating movement in response to a signal from said control system.

10. A crop baler as claimed in claim 1, said control system including an electrical control unit operable to output electrical control signals for controlling operation of said motors.

11. A crop baler comprising:
    a bale chamber within which a bale of crop material is formed;
    a plurality of knotters for use in binding the bale with a corresponding plurality of binding strands looped around the bale, each of said knotters being operable when actuated to form at least one knot in its corresponding binding strand, each of said knotters including a generally vertically swingable tucker finger operable when actuated to assist in presenting one of said strand segments to the corresponding knotter, said tucker fingers of the knotters being operated by a common operating shaft, and each of said strands comprising a pair of end-to-end strand segments connected to one another at two connection points in each loop around a bale;
    at least one actuating motor for each of said knotters; and
    a control system operably coupled with said motors for controlling operation of the motors, said at least one motor comprising a fluid pressure-operated linear motor for driving said operating shaft in a generally oscillating movement in response to a signal from said control system, and said control system being operable to cause the knotter to form a knot at each of said two connection points of the strand segments.

12. A crop baler as claimed in claim 11, said fluid pressure-operated motors comprising rotary hydraulic motors.

13. A crop baler as claimed in claim 11, said fluid pressure-operated motors comprising pneumatic motors.

14. A crop baler as claimed in claim 11, said control system including an electrical control unit operable to output electrical control signals for controlling operation of said motors.

15. A crop baler comprising:
 a bale chamber within which a bale of crop material is formed;
 a plurality of knotters for use in binding the bale with a corresponding plurality of binding strands looped around the bale, each of said knotters being operable when actuated to form at least one knot in its corresponding binding strand, said knotters each including a finger operable when actuated to swing generally horizontally and position the strand in the corresponding knotter, said fingers of the knotters being operably coupled with a common operating shaft for actuation of said fingers in unison;
 at least one actuating motor for each of said knotters; and
 a control system operably coupled with said motors for controlling operation of the motors, said at least one motor comprising a fluid-pressure operated linear motor for driving the shaft in a generally oscillating movement in response to a signal from said control system.

16. A crop baler as claimed in claim 15, said fluid pressure-operated motors comprising rotary hydraulic motors.

17. A crop baler as claimed in claim 15, said fluid pressure-operated motors comprising pneumatic motors.

18. A crop baler as claimed in claim 15, said control system including an electrical control unit operable to output electrical control signals for controlling operation of said motors.

\* \* \* \* \*